US007027091B1

(12) United States Patent
Reyneri et al.

(10) Patent No.: US 7,027,091 B1
(45) Date of Patent: Apr. 11, 2006

(54) DETECTION OF COLOR FILTER ARRAY ALIGNMENT IN IMAGE SENSORS

(75) Inventors: Justin Reyneri, Los Altos, CA (US); Ricardo J. Motta, Palo Alto, CA (US)

(73) Assignee: Pixim, Inc., Mountain View, CA (US)

( * ) Notice: Subject to any disclaimer, the term of this patent is extended or adjusted under 35 U.S.C. 154(b) by 748 days.

(21) Appl. No.: 09/954,138

(22) Filed: Sep. 17, 2001

(51) Int. Cl.
*H04N 9/47* (2006.01)

(52) U.S. Cl. ........................ 348/280; 348/273; 348/275

(58) Field of Classification Search ......... 348/273–275, 348/277, 280, 245, 241–243; 382/151, 157; 395/152; 250/578
See application file for complete search history.

(56) References Cited

U.S. PATENT DOCUMENTS 4,523,102 A * 6/1985 Kazufumi et al. ....... 250/208.1
4,698,113 A * 10/1987 Ogawa .................... 156/275.7
4,841,358 A * 6/1989 Kammoto et al. .......... 358/512
5,204,948 A * 4/1993 Kato .......................... 358/520
5,774,196 A * 6/1998 Marshall ...................... 348/743
6,157,407 A * 12/2000 Kobayashi .................. 348/241
6,614,473 B1 * 9/2003 Kijima ....................... 348/243
2002/0171881 A1 * 11/2002 Merrill et al. .............. 358/513

* cited by examiner

*Primary Examiner*—David L. Ometz
*Assistant Examiner*—Gevell Selby
(74) *Attorney, Agent, or Firm*—Steve Mendelsohn; Yuri Gruzdkov; Carmen Cook

(57) ABSTRACT

Methods of detecting relative misalignment between a color filter array and a sensor array in a color sensor array. The present invention provides methods for detecting and compensating for shifts of one or more rows and/or columns between a color filter array and a sensor array that may occur during the color sensor array fabrication process. The present invention also enables the use of color sensor arrays in which the alignment of a color filter array relative to the corresponding sensor array is unknown. In one embodiment, a detectable pattern of one or more pixels (e.g., pixels having black filters) is introduced into the periphery of the color sensor array. The position of the pattern is detected and color image data are processed with respect to the detected position. The invention is very cost effective and enables the use of image sensors with misaligned color filter arrays just as if they were manufactured correctly. The benefits of the present invention include (1) increased manufacturing yields and, therefore, lower per unit manufacturing cost and (2) higher reliability of image sensors configured with color filter arrays.

39 Claims, 5 Drawing Sheets

300

400

500

700

800

900

DETECTION OF COLOR FILTER ARRAY ALIGNMENT IN IMAGE SENSORS

BACKGROUND OF THE INVENTION

1. Field of the Invention

The present invention relates to image sensors configured with color filter arrays.

2. Description of the Related Art

Imaging systems, such as digital cameras, are used for still photography and video recording. The images captured by the system may be used for viewing/processing in a variety of representations, such as electronic, digital, or printed. For color imaging, image data are typically captured in three different colors, e.g., red, green, and blue. When the three sets of data representing the colors are combined, a color image of the scene is created. Capturing these three sets of data can be achieved in a number of ways. In digital imaging, this is often accomplished by using a two-dimensional sensor array comprising photosensitive pixels that are covered by a pattern of red, green, and blue filters, which pattern is known as a color filter array (CFA).

FIG. 1 shows a schematic block diagram of a digital camera 100. Camera 100 uses a lens 102 to collect light from a scene. The light is captured by a color sensor array (CSA) 104 comprising a CFA 106 and a sensor array 108. Light passes through and is filtered by CFA 106 and is converted into digital signals by sensor array 108. The resulting image data are stored in and/or processed by a memory/processor block 110. The data can then be output from camera 100 to external devices through an interface 112. Sensor array 108 may be a CCD array, a CMOS array, or some other one- or two-dimensional imaging device.

FIG. 2 shows one possible implementation of CSA 104 of FIG. 1. Photosensitive pixels with associated color filters are represented by rectangles in the grid of FIG. 2. An R indicates a pixel having a red filter. Similarly, pixels with a green or blue filter are indicated by a G or B, respectively. Color filters in CFA 106 of CSA 104 are arranged in a particular pattern, known as the Bayer pattern, as described in U.S. Pat. No. 3,971,065, the teachings of which are incorporated herein by reference. A kernel 202 of the Bayer pattern has four color filters in a 2×2 arrangement. Starting from the upper left corner and going clockwise, the color sequence within kernel 202 is green-red-green-blue (GRGB). This kernel is replicated throughout CFA 106 in both the horizontal and vertical directions.

In the example shown in FIG. 2, only a central region 204 of CSA 104 is used to generate an image. A 2×2 block 206 of color filters of CFA 106 in the upper left corner of region 204 has the desired GRGB Bayer sequence. Region 204 is surrounded by several rows/columns of extra pixels, the signals of which are not represented in the image. Having such extra pixels is common practice in image sensors. Only some of the pixels outside central region 204 have color filters. An O indicates a pixel that does not have a color filter. In the particular example of FIG. 2, the row/column at each edge of array 106 has pixels without color filters.

Fabrication of a CSA (e.g., by deposition of a CFA onto a sensor array) is a separate step in the image sensor manufacturing process. Typically, it is carried out at a separate facility after the sensor array, such as array 108 of FIG. 1, has already been fabricated. A common manufacturing defect is misalignment of the CFA relative to the sensor array. Frequently, the misalignment involves a shift by one row and/or one column between the CFA and the sensor array.

FIG. 3 shows a CSA 300, similar to CSA 104 of FIG. 2. However, in CSA 300, CFA 302 is misaligned relative to the sensor array by being shifted one column to the right. A 2×2 block 306 of color filters of CFA 302 in the upper left corner of central region 304 of CSA 300 forms an RGBG sequence as opposed to the desired GRGB sequence of the Bayer pattern. If a digital image is produced using CSA 300, severe color distortion may result.

FIGS. 4 and 5 show two other possible misalignments. In FIG. 4, CFA 402 of CSA 400 is shifted down by one row resulting in a BGRG sequence for a 2×2 block 406 of color filters of CFA 402 in the upper left corner of central region 404 of CSA 400. In FIG. 5, CFA 502 of CSA 500 is shifted by one row down and by one column right resulting in a GBGR sequence for a 2×2 block 506 of color filters of CFA 502 in the upper left corner of central region 504 of CSA 500. Similar to CSA 300, the misalignments in CSAs 400 and 500 may cause severe color distortions.

SUMMARY OF THE INVENTION

The present invention provides methods for detecting and compensating for misalignments of one or more rows and/or columns between a color filter array (CFA) and a sensor array that may occur during the color sensor array (CSA) fabrication process. These methods are very cost effective and enable the use of image sensors with misaligned CFAs just as if they were manufactured correctly. The present invention also enables the use of CSAs in which the alignment of a CFA relative to the corresponding sensor array is unknown. The benefits of the present invention include (1) increased manufacturing yields and, therefore, lower per unit manufacturing cost and (2) higher reliability of image sensors having CFAs.

According to one embodiment, the present invention is an integrated circuit having a CSA comprising a sensor array configured with a CFA, wherein: (a) the sensor array comprises an array of photosensitive pixels, (b) the CFA comprises an array of color filters, (c) each color filter in the CFA is associated with a photosensitive pixel in the sensor array, (d) a first set of color filters in the CFA is arranged in a first pattern corresponding to a central imaging region of the CSA; and (e) a second set of one or more color filters in the CFA is arranged in a second pattern different from the first pattern, such that detection of the second pattern enables characterization of alignment between the sensor array and the CFA in the CSA.

According to another embodiment, the present invention is a method of characterizing a CSA comprising the steps of: (a) subjecting the CSA to light and (b) analyzing CSA response to the light to characterize alignment between a sensor array and a CFA in the CSA.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to “one embodiment” or “an embodiment” means that a particular feature, structure, or characteristic described in connection with the embodiment can be included in at least one embodiment of the invention. The appearances of the phrase “in one embodiment” in various places in the specification are not necessarily all referring to the same embodiment, nor are separate or alternative embodiments mutually exclusive of other embodiments. The description herein is largely based on a particular image sensor having a digital sensor array configured with a Bayer color filter array. Those skilled in the art can appreciate that the description can be equally applied to other image sensors including analog sensor arrays and other color filter arrays.

Figure 3:
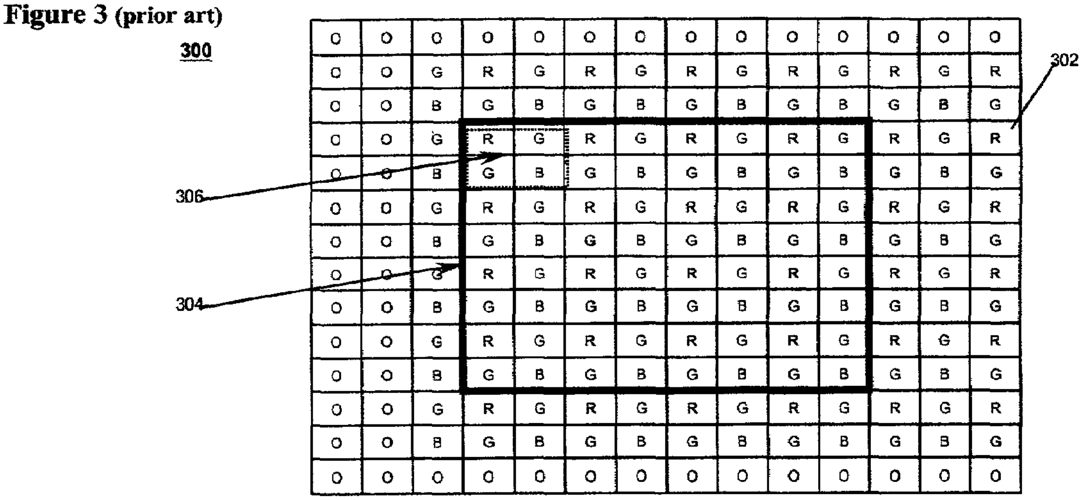
FIGS. 3–5 depict representative misalignments of a color filter array relative to a sensor array in a CSA.
Figure 4:
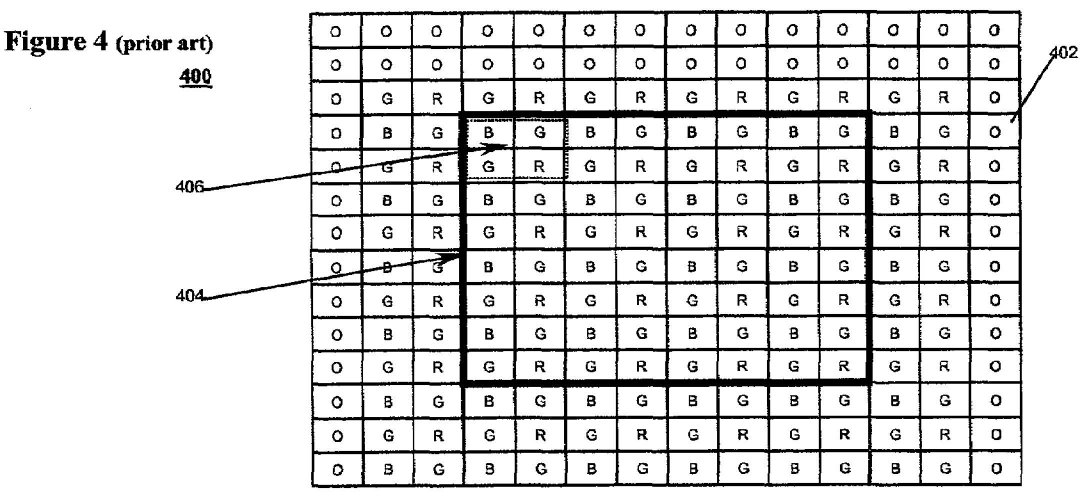
Figure 5:
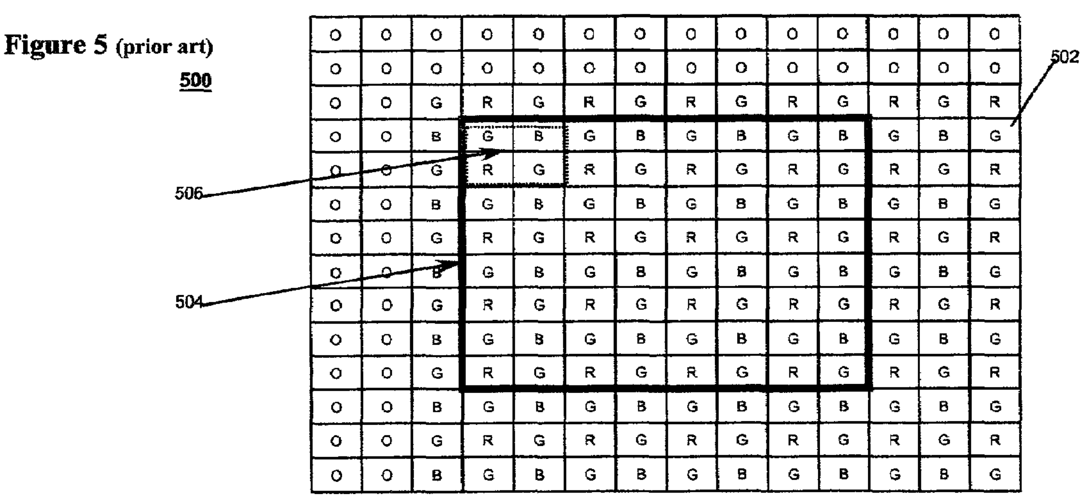
Figure 6:
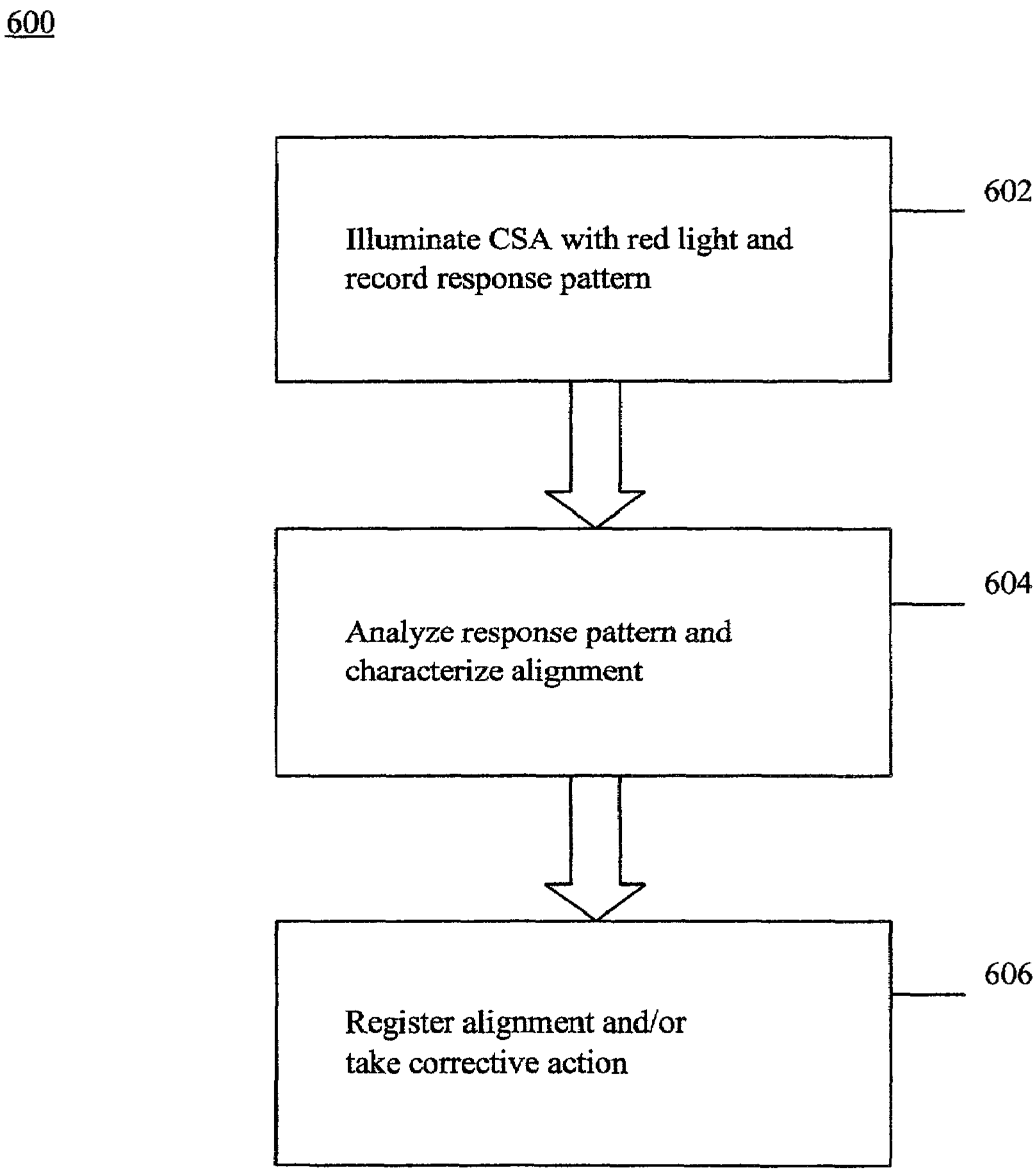
FIG. 6 shows a flowchart of a method of detecting and compensating for manufacturing defects according to one embodiment of the present invention.

FIG. 6 is a flowchart showing an off-line method 600 of detecting and compensating for manufacturing defects of the types illustrated in FIGS. 3–5 according to one embodiment of the present invention. In a first step 602 of method 600, a CSA is illuminated with red light and a response pattern of the CSA is recorded. In a second step 604, the response pattern is analyzed and CSA misalignment, if any, is characterized. In a third step 606, the CFA alignment is registered and/or a corrective action is implemented to address the misalignment in the CSA. Below, steps 602–606 are described in more details.

Figure 1:
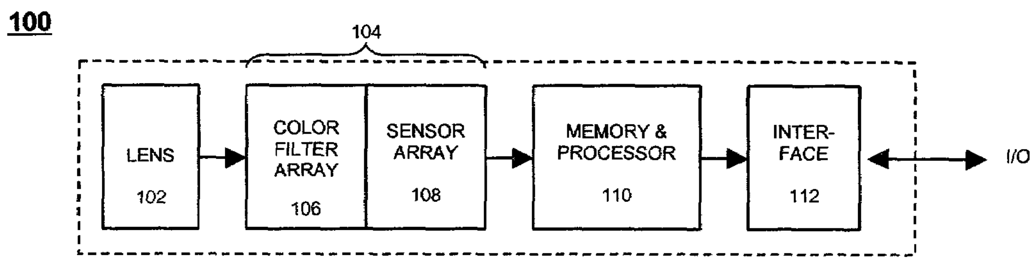
FIG. 1 shows a schematic block diagram of a digital camera of the prior art.
Figure 2:
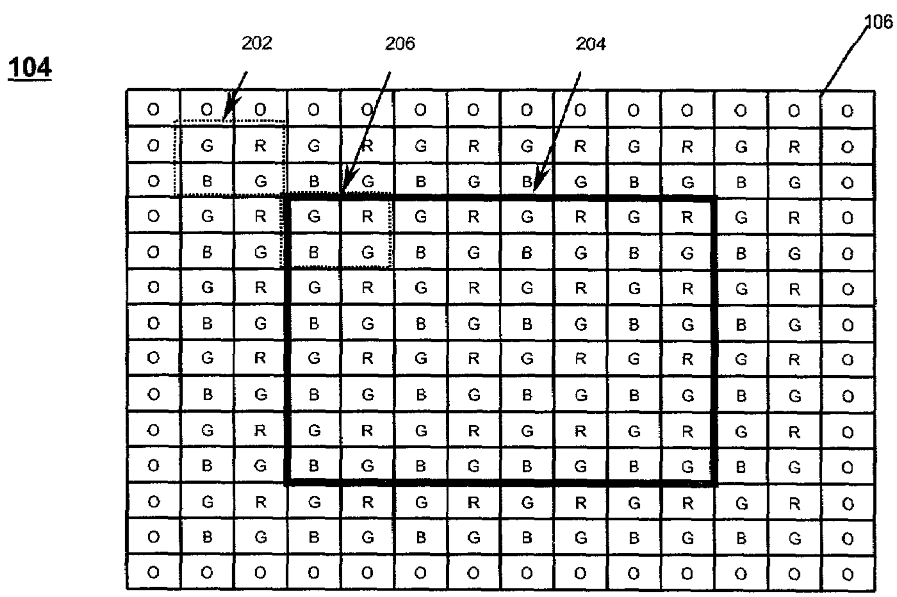
FIG. 2 shows a schematic diagram of a color sensor array that may be used in the digital camera of FIG. 1.

Since blue and green filters transmit very little of red light, the pixels covered by such filters will show little or no response in step 602. On the other hand, the pixels covered by red filters are sensitive to red light and will show substantial response. If a CFA is aligned correctly with respect to a sensor array, as shown in FIG. 2, the pixels of block 206 of CSA 104 will respond in a low-high-low—low (LHLL) pattern. In contrast, misaligned CFAs of the types illustrated in FIGS. C–E will result in the following response patterns:

HLLL for the pixels of block 306 of CSA 300;

LLHL for the pixels of block 406 of CSA 400; and

LLLH for the pixels of block 506 of CSA 500.

In step 604, a particular response pattern is recognized and the corresponding alignment problem, if any, is identified.

Since the CFA pattern repeats itself every two rows and columns, shifts by an even number of rows and/or columns are essentially equivalent to the correct alignment as long as the shift is not so large as to expose the central region of the CSA, such as central region 204 of CSA 104 (i.e., to have one or more rows/columns of region 204 without color filtering). In a similar way, shifts by an odd number of rows and/or columns are essentially equivalent to the shifts by one row and/or column shown in FIGS. 3–5. Thus, typical (i.e., relatively small) misalignments by integer numbers of rows and/or columns can be detected and characterized in step 604.

In one implementation of step 606 of method 600, the characterized CFA alignment can be permanently recorded in a register located either on-chip or off-chip. Numerous techniques can be employed to implement such CFA registration. For example, in one embodiment, the CFA alignment can be recorded electrically in a programmable read-only memory. In an alternative embodiment, the CFA alignment can be recorded in a flash memory. Once the CFA alignment has been recorded, image-processing algorithms can refer to it to compensate for the problem during real-time processing.

Figure 7:
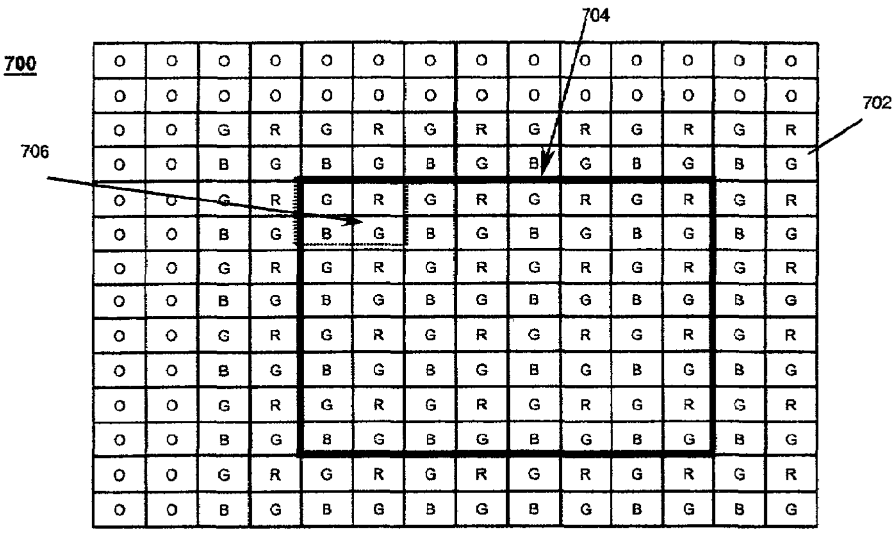
FIG. 7 illustrates one implementation of step 606 for the method of FIG. 6.

FIG. 7 illustrates one possible implementation of a corrective action of step 606. FIG. 7 shows a CSA 700 that has a CFA 702 shifted by one row down and one column right relative to a sensor array, similar to that of CSA 500 of FIG. 5. In step 606, the “central” imaging region 704 of CSA 700 is re-configured in such a way that a 2×2 block 706 of pixels in its upper left corner has the desired GRGB Bayer sequence of color filters.

In another implementation of step 602 of method 600, blue light can be used instead of red light. In this case, the desired response of pixels 206 of CSA 104 of FIG. 2 will be LLLH and the misaligned CSAs of FIGS. 3, 4, and 5 will produce LLHL, HLLL, and LHLL patterns, respectively.

A different problem similar to the CFA misalignment problem addressed by the embodiments described above may arise when the alignment of the CFA relative to the sensor array in a CSA is unknown. Such a problem is likely to occur when (1) new software has to be loaded into an imaging system and this software cannot use the previously used CFA registration table, or (2) the CFA registration table is absent or missing.

Figure 8:
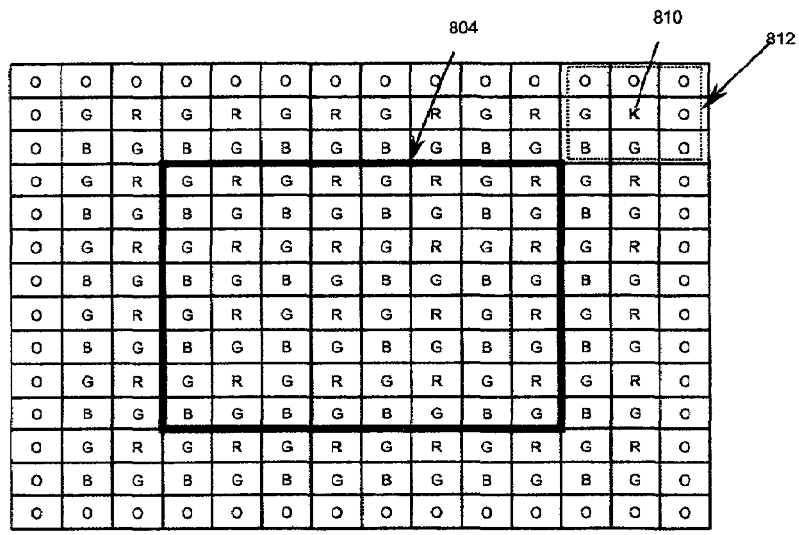
FIG. 8 shows a CSA according to another embodiment of the present invention.
Figure 9:
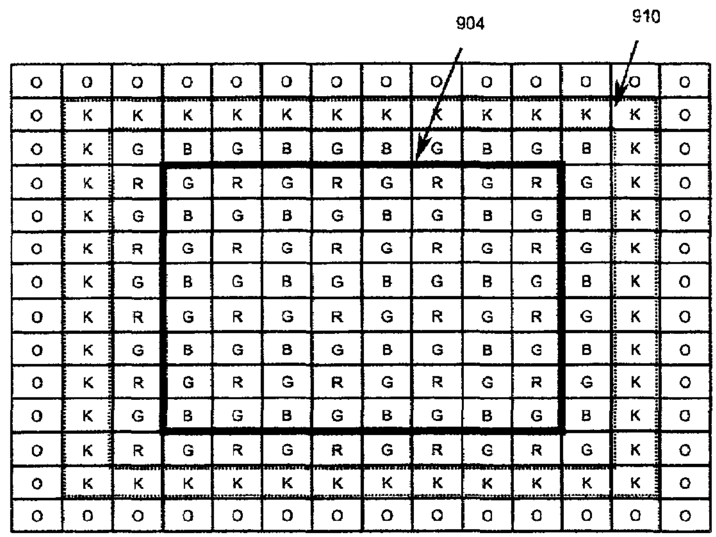
FIG. 9 shows a CSA according to an alternative embodiment of the present invention.

FIGS. 8 and 9 illustrate alternative embodiments of the present invention that enable (1) the detection of and compensation for CFA misalignments and (2) the use of a CSA with unknown alignment of a CFA relative to the corresponding sensor array. These embodiments introduce an easily detectable pattern into a portion of the CFA outside the central region, such as central region 204 of CSA 104 of FIG. 2.

In the embodiment shown in FIG. 8, one pixel 810 of CSA 800, indicated by a K in the drawing, is covered with a “black” filter that is substantially not transparent to light. One way of making such a filter is to superimpose red, green, and blue filters in a CFA over the same pixel. During a testing step similar to step 602 of method 600, CSA 800 is illuminated with non-monochromatic (e.g., white) light to which all the red, green, and blue pixels respond, and the response pattern of the CSA is recorded. Then, an algorithm looks for the location of black pixel 810 and either registers it or compares it to the expected location.

For example, when CFA misalignment needs to be detected, to detect shifts by one row and/or one column, the response of eight pixels 812 around the expected location of pixel 810 is analyzed. By analyzing a larger region around the expected location of pixel 810, larger misalignments can be quickly detected. After the misalignment has been detected, it can be registered and/or compensated for in a corrective action, similar to the corrective action of step 606 of method 600.

In a case where CFA alignment is unknown, the detected location of pixel 810 can be used to generate a CFA registration table. For example, when a CSA is configured with a CFA having a Bayer pattern of red, green, and blue color filters, as shown in FIG. 8, the detected location of pixel 810 unambiguously defines the position of the entire pattern in the CFA relative to the sensor array. In this case, the registration table may have the location (e.g., upper left corner) and dimensions (e.g., height and width) of the Bayer pattern.

Alternatively, a CSA may be configured with a CFA having a known, periodic or non-periodic, pattern of color filters. In this situation, a color of the color filter corresponding to each individual pixel in the CSA is determined from the position of that pixel relative to pixel 810. Then, a registration table can be a list of pixels and the corresponding color filters.

FIG. 9 shows a CSA 900 according to another embodiment of the present invention. CSA 900 comprises a frame 910 of black pixels where each black pixel is similar to pixel 810 of CSA 800 of FIG. 8. Frame 910 can be one or more pixels wide. Frame 910 is preferably placed a small distance (e.g., one column/row) away from central region 904 of CSA 900. During a testing step similar to step 602 of method 600, CSA 900 is illuminated with non-monochromatic light and the response pattern of the CSA is recorded. Then, the algorithm looks for the location of frame 910 instead of single pixel 810. Using the detected location of frame 910, the alignment of the CFA in the CSA is detected and registered and/or the possible misalignment is compensated for in a corrective action, similar to the corrective action of step 606 of method 600.

Figure 10:
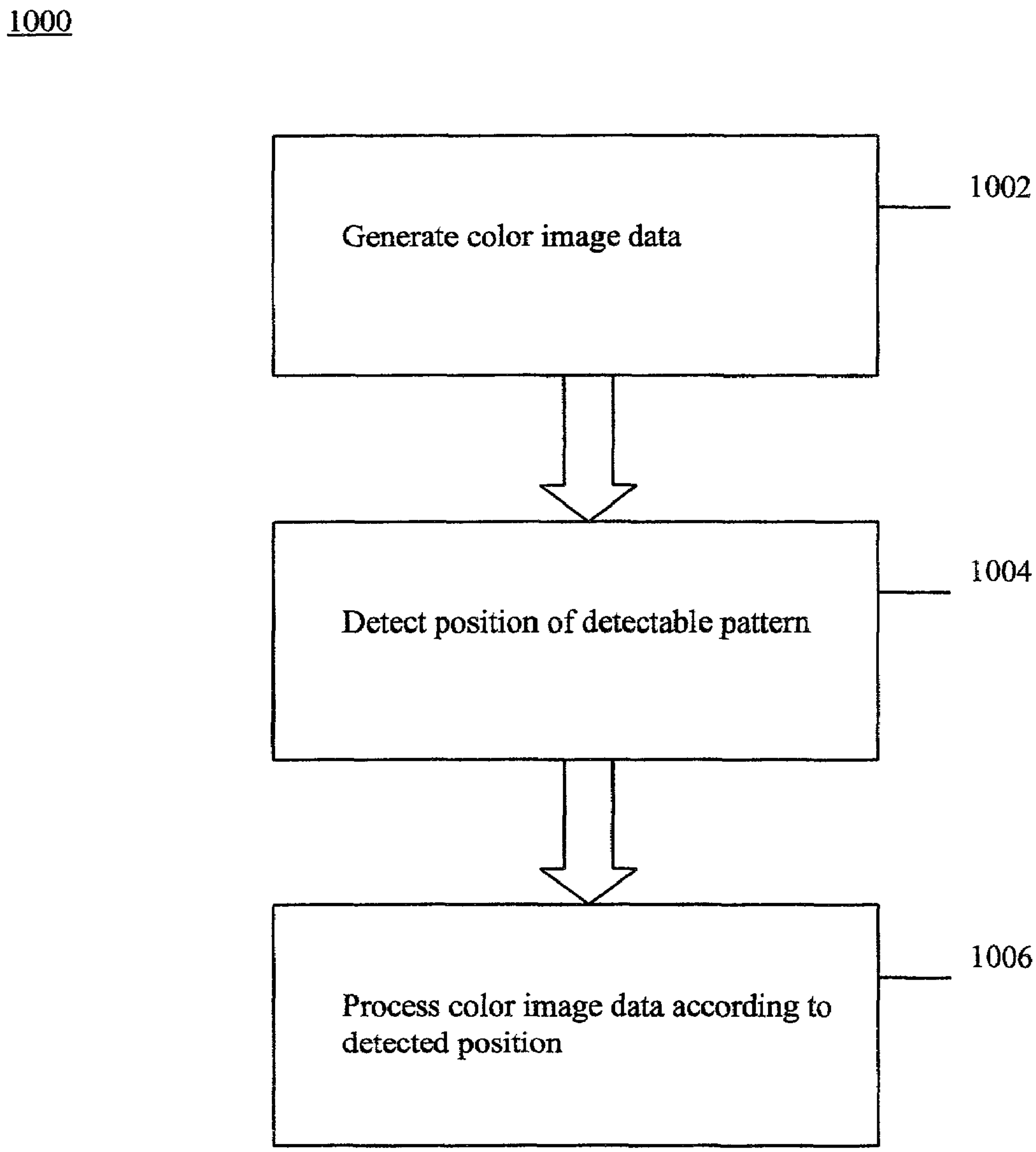
FIG. 10 shows a flowchart of a method of detecting alignment of a CFA in the corresponding CSA according to yet another embodiment of the present invention.

FIG. 10 is a flowchart showing a real-time method 1000 of detecting alignment of a CFA in the corresponding CSA according to yet another embodiment of the present invention. Method 1000 of FIG. 10 can also be used for detecting and compensating for manufacturing defects. The method can use CSAs with detectable patterns, such as CSAs 800 and 900, after the image sensors have already been assembled into digital cameras without performing off-line method 600. For example, a camera having CSA 900 is used to take an image of a scene in a conventional way in step 1002. Provided that the edges of the image are not totally dark, image-processing software detects the position of the edges of frame 910 in step 1004 of FIG. 10 and processes the color data of the image accordingly in step 1006. Although the operation of detecting frame 910 has to be performed every time an image is taken, it is relatively simple and fast in practice. Digital cameras routinely perform more sophisticated processing of the pixels in the central imaging region, such as region 904 of FIG. 9, which typically comprises over 300,000 pixels. In contrast, examining the edges of an image of that size will require relatively simple processing of only two to four thousand pixels.

In general, the present invention may be implemented for image sensors having one or more pixels arranged in either a one- or two-dimensional pattern. The individual pixels within a given sensor array may be the same or different. Color sensor arrays according to the present invention may be part of an integrated system-on-a-chip (SOC) image sensor or a stand-alone image sensor.

While this invention has been described with reference to the illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims. For example, the invention need not use the Bayer pattern of red, green, and blue pixels, but may also use a different set of complementary colors such as cyan, yellow, and magenta and/or a different pattern. For patterns other than the Bayer pattern, other colored light may need to be used for unambiguous determination of misalignment. Also, detectable patterns may have different shapes and/or be comprised of pixels configured with color filters other than black filters or with no filters at all.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. An integrated circuit having a color sensor array (CSA) comprising a sensor array configured with a color filter array (CFA), wherein:

the sensor array comprises an array of photosensitive pixels;

the CFA comprises an array of color filters;

each color filter in the CFA is associated with a photosensitive pixel in the sensor array;

a first set of color filters in the CFA is arranged in a first pattern corresponding to a central imaging region of the CSA; and a second set of one or more color filters in the CFA is arranged in a second pattern different from the first pattern and corresponding to a peripheral imaging region of the CSA, such that detection of the second pattern enables characterization of alignment between the sensor array and the CFA in the CSA, wherein the second set has a portion associated with at least one pixel of the sensor array, wherein light impinging upon said portion passes through a filter having a color other than black and is received at said at least one pixel.

2. The invention of claim 1, wherein the first pattern is formed by repeating a kernel having a Bayer pattern of red, green, and blue color filters.

3. The invention of claim 1, wherein the second pattern consists of a single color filter located outside the central imaging region.

4. The invention of claim 1, wherein the second pattern comprises a frame of color filters surrounding the central imaging region.

5. The invention of claim 4, wherein the frame is one color filter wide.

6. The invention of claim 1, wherein the second pattern comprises one or more black filters.

7. The invention of claim 6, wherein each black filter is produced by superposition of different color filters.

8. The invention of claim 1, wherein the second pattern has a footprint located outside of a footprint of the first pattern.

9. The invention of claim 8, wherein the second pattern is separated from the central imaging region by at least one row/column.

10. The invention of claim 1, wherein the at least one filter having a color other than black is not superposed with any other color filters.

11. The invention of claim 1, wherein each color filter in the CFA is associated with only one photosensitive pixel.

12. A method for fabricating a color sensor array (CSA) comprising the steps of:

(a) forming a sensor array comprising an array of photosensitive pixels;

(b) forming a color filter array (CFA) configured to the sensor array, wherein:

the CFA comprises an array of color filters;

each color filter in the CFA is associated with a photosensitive pixel in the sensor array;

a first set of color filters in the CFA is arranged in a first pattern corresponding to a central imaging region of the CSA; and a second set of one or more color filters in the CFA is arranged in a second pattern different from the first pattern and corresponding to a peripheral imaging region of the CSA, such that detection of the second pattern enables characterization of alignment between the sensor array and the CFA in the CSA, wherein the second set has a portion associated with at least one pixel of the sensor array, wherein light impinging upon said portion passes through a filter having a color other than black and is received at said at least one pixel.

13. The invention of claim 12, wherein the CSA is produced by deposition of the CFA onto the sensor array.

14. The invention of claim 12, wherein the first pattern is formed by repeating a kernel having a Bayer pattern of red, green, and blue color filters.

15. The invention of claim 12, wherein the second pattern consists of a single color filter located outside the central imaging region.

16. The invention of claim 12, wherein the second pattern comprises a frame of color filters surrounding the central imaging region.

17. The invention of claim 16, wherein the frame is one color filter wide.

18. The invention of claim 12, wherein the second pattern comprises one or more black filters.

19. The invention of claim 18, wherein each black filter is produced by superposition of different color filters.

20. The invention of claim 12, wherein the second pattern has a footprint located outside of a footprint of the first pattern.

21. The invention of claim 20, wherein the second pattern is separated from the central imaging region by at least one row/column.

22. The invention of claim 12, wherein the at least one filter having a color other than black is not superposed with any other color filters.

23. The invention of claim 12, wherein each color filter in the CFA is associated with only one photosensitive pixel.

24. A method of characterizing a color sensor array (CSA), the method comprising the steps of:

(a) subjecting the CSA to light; and (b) analyzing CSA response to the light to characterize alignment between a sensor array and a color filter array (CFA) in the CSA, wherein:

the sensor array comprises an array of photosensitive pixels;

the CFA comprises an array of color filters;

each color filter in the CFA is associated with a photosensitive pixel in the sensor array;

a first set of color filters in the CFA is arranged in a first pattern corresponding to a central imaging region of the CSA; and a second set of one or more color filters in the CFA is arranged in a second pattern different from the first pattern and corresponding to a peripheral imaging region of the CSA, wherein the second set has a portion associated with at least one pixel of the sensor array, wherein light impinging upon said portion passes through a filter having a color other than black and is received at said at least one pixel.

25. The invention of claim 24, wherein:

step (a) comprises the step of subjecting the CSA to non-monochromatic light; and step (b) comprises the step of detecting the second pattern to characterize the alignment between the sensor array and the CFA in the CSA.

26. The invention of claim 23, wherein steps (a) and (b) are performed off-line and the non-monochromatic light is white light.

27. The invention of claim 23, wherein steps (a) and (b) are performed during real-time processing and the non-monochromatic light corresponds to a real image.

28. The invention of claim 27, further comprising the step of applying image-processing techniques to produce color image data in real-time.

29. The invention of claim 24, wherein the first pattern is formed by repeating a kernel having a Bayer pattern of red, green, and blue color filters.

30. The invention of claim 24, wherein the second pattern comprises a frame of black filters.

31. The invention of claim 30, wherein each black filter is produced by superposition of different color filters.

32. The invention of claim 24, wherein:

the CFA comprises an array of color filters arranged in a pattern comprising a repeated kernel of colors;

step (a) comprises the step of subjecting the CSA to monochromatic light; and step (b) comprises the step of analyzing the CSA response in a subset of pixels in the central imaging region to determine a response sequence, wherein the response sequence indicates a particular type of misalignment between the CFA and the sensor array.

33. The invention of claim 24, further comprising the step of storing information about the alignment in a register, wherein the information is accessible during real-time processing to enable generation of color image data.

34. The invention of claim 33, wherein the register is on-chip.

35. The invention of claim 33, wherein the register comprises a table of pixels and corresponding color filters.

36. The invention of claim 24, further comprising the step of detecting misalignment between the sensor array and the CFA in the CSA and re-configuring boundaries of the central imaging region of the CSA to compensate for the misalignment.

37. The invention of claim 24, wherein the at least one filter having a color other than black is not superposed with any other color filters.

38. The invention of claim 24, wherein each color filter in the CFA is associated with only one photosensitive pixel.

39. The invention of claim 24, wherein the second pattern has a footprint located outside of a footprint of the first pattern.

* * * * *